US009798062B2

(12) United States Patent
Kitamura et al.

(10) Patent No.: US 9,798,062 B2
(45) Date of Patent: Oct. 24, 2017

(54) LIQUID CRYSTAL DISPLAY DEVICE THAT SWITCHES BETWEEN A TRANSPARENT STATE AND AN OPAQUE STATE COMPRISING FIRST AND SECOND LIGHT SOURCES

(71) Applicant: OMRON Corporation, Kyoto (JP)

(72) Inventors: Norikazu Kitamura, Osaka (JP); Yoshimasa Osumi, Kyoto (JP); Yasuhiro Tanoue, Shiga (JP); Yoshihiko Takagi, Kyoto (JP); Norihisa Kanzaki, Shiga (JP); Masayuki Shinohara, Kyoto (JP); Junya Fujita, Aichi (JP); Takamitsu Ishikawa, Aichi (JP); Takeshi Kakinuma, Gifu (JP); Jun Kishimoto, Gifu (JP); Masaaki Hiramatsu, Aichi (JP)

(73) Assignee: OMRON Corporation, Kyoto (JP)

( * ) Notice: Subject to any disclaimer, the term of this patent is extended or adjusted under 35 U.S.C. 154(b) by 190 days.

(21) Appl. No.: 14/812,735

(22) Filed: Jul. 29, 2015

(65) Prior Publication Data

US 2016/0054601 A1 Feb. 25, 2016

(30) Foreign Application Priority Data

Aug. 25, 2014 (JP) ................................ 2014-170916

(51) Int. Cl.
*F21V 8/00* (2006.01)
(52) U.S. Cl.
CPC ......... *G02B 6/0016* (2013.01); *G02B 6/0036* (2013.01)

(58) Field of Classification Search
CPC ......... G02F 1/137; G02F 2001/133626; G02B 6/0016
See application file for complete search history.

(56) References Cited

U.S. PATENT DOCUMENTS

| | | | | |
|---|---|---|---|---|
| 2009/0091667 A1* | 4/2009 | Schultz | ............. | G02B 27/2214 349/15 |
| 2012/0236403 A1* | 9/2012 | Sykora | ............... | G02B 27/2214 359/463 |
| 2013/0076999 A1* | 3/2013 | Minami | ............... | G02B 6/0036 349/15 |
| 2013/0121027 A1* | 5/2013 | Minami | ............. | H04N 13/0411 362/613 |
| 2013/0162694 A1* | 6/2013 | Suzuki | ................. | G02B 6/0043 345/690 |

FOREIGN PATENT DOCUMENTS

JP 2013-028082 A 2/2013

* cited by examiner

*Primary Examiner* — Paul Lee
(74) *Attorney, Agent, or Firm* — Osha Liang LLP

(57) ABSTRACT

A display device has a liquid crystal panel that switches between a transparent state and an opaque state, a first light source, a light guide plate arranged on a back surface of the liquid crystal panel and made of a transparent material, the light guide plate having an incident surface facing the first light source and an outgoing surface facing the back surface of the liquid crystal panel, propagating light emitted from the first light source and incident through the incident surface, and outputting the light toward the liquid crystal panel from the outgoing surface, and a second light source configured to illuminate an object arranged on an opposite side to the liquid crystal panel with the light guide plate interposed therebetween.

13 Claims, 9 Drawing Sheets

*FIG. 5*

| Pattern density | Haze value | Transparency |
|---|---|---|
| 1.9% |  | OK |
| 3.9% | 9.1% | OK |
| 5.8% |  | OK |
| 7.7% | 11.7% | OK |
| 15.5% | 17.3% | OK |
| 30.9% | 28.4% | NG |

500

LIQUID CRYSTAL DISPLAY DEVICE THAT SWITCHES BETWEEN A TRANSPARENT STATE AND AN OPAQUE STATE COMPRISING FIRST AND SECOND LIGHT SOURCES

CROSS-REFERENCE TO RELATED APPLICATION

This application claims priority to Japanese Patent Application No. 2014-170916 filed with the Japan Patent Office on Aug. 25, 2014, the entire contents of which are incorporated herein by reference.

BACKGROUND

Field

The present invention relates to a display device that can switch between a transparent state and an opaque state.

Related Art

Conventionally, there is proposed an element having a light control function of transmitting light in the transparent state and of shielding the light in the opaque state (for example, see Unexamined Japanese Patent Publication No. 2013-28082).

For example, a light control film disclosed in Unexamined Japanese Patent Publication No. 2013-28082 includes: two transparent conductive resin base materials; a light control layer that is sandwiched between the two base materials to include a resin matrix and a light controlling suspension dispersed in the resin matrix; and a primer layer that is provided between the transparent conductive resin base material and the light control layer, the primer layer containing an organic binder resin and silicon dioxide particles, an average film thickness of the primer layer ranging from 30 nm to 75 nm.

The light control film maintains a clear coloring state without light scattering unless an electric field is applied, and the light control film is converted into the transparent state when the electric field is applied.

SUMMARY

However, in the light control film disclosed in Unexamined Japanese Patent Publication No. 2013-28082, a response time ranges from 1 second to 50 seconds with respect to the electric field during a decoloring state, the response time ranges from 1 second to 100 seconds with respect to the electric field during the coloring state, and the response time is too long. For this reason, the light control film is not suitable for applications in which switching between the transparent state and the opaque state is required in a short time.

One or more embodiments of the present invention provides a display device that can enhance the response speed of the switching between the transparent state and the opaque state.

A display device according to one or more embodiments of the present invention comprises a liquid crystal panel configured to be able to switch between a transparent state and an opaque state; a first light source; a light guide plate arranged on a back surface of the liquid crystal panel and made of a transparent material, the light guide plate including an incident surface facing the first light source and an outgoing surface facing the back surface of the liquid crystal panel, in which the light guide plate propagates light inside thereof, the light being emitted from the first light source and incident through the incident surface, and outputs the light toward the liquid crystal panel from the outgoing surface; a second light source configured to illuminate an object arranged on an opposite side to the liquid crystal panel with the light guide plate interposed therebetween; and a controller configured to put the liquid crystal panel into the opaque state when the first light source is lit, to put the liquid crystal panel into the transparent state when the second light source is turned off while the second light source is lit, and to turn off the first light source.

In the display device, according to one or more embodiments of the present invention, a plurality of patterns are formed in at least one of the outgoing surface of the light guide plate and a surface on opposite side to the outgoing surface, the plurality of patterns being formed into a shape that reflects or refracts the light propagating through the light guide plate such that the light output from the outgoing surface, and an area ratio of a region where the plurality of patterns are formed to the surface in which the plurality of patterns are formed is less than or equal to 30%.

In the display device, according to one or more embodiments of the present invention, the plurality of patterns are arrayed at predetermined intervals along a propagation direction of the light from the first light source in the surface on the opposite side to the outgoing surface, and each of the plurality of patterns includes a reflecting surface that is inclined with respect to the surface on the opposite side to the outgoing surface by an angle at which the light, which is emitted from the first light source and incident on the light guide plate from the incident surface, is totally reflected toward the outgoing surface.

According to one or more embodiments of the present invention, the light guide plate includes a second incident surface that is formed so as to face the incident surface with the plurality of patterns interposed therebetween. According to one or more embodiments of the present invention, the first light source includes a first light emitting element that is arranged so as to face the incident surface and a second light emitting element that is arranged so as to face the second incident surface. According to one or more embodiments of the present invention, each of the plurality of patterns further includes a second reflecting surface that is inclined with respect to the surface on the opposite side to the outgoing surface by an angle at which the light, which is emitted from the second light emitting element and incident on the light guide plate from the second incident surface, is totally reflected toward the outgoing surface.

In the display device, according to one or more embodiments of the present invention, a haze value of the light guide plate to the light, which is incident on the light guide plate from the surface on the opposite side to the outgoing surface and transmitted onto the outgoing surface side, is less than or equal to 28%.

According to one or more embodiments of the present invention, the display device further includes a direction-selective light shielding member formed into a sheet shape between the light guide plate and the object, the direction-selective light shielding member including a first surface facing the light guide plate and a second surface facing the object, the direction-selective light shielding member including inside thereof a plurality of opaque members arranged at predetermined intervals along the propagation direction of the light from the first light source, the plurality of opaque members being extended in a direction intersecting the propagation direction.

The display device according to one or more embodiments of the present invention may be able to enhance the response speed of the switching between the transparent state and the opaque state.

BRIEF DESCRIPTION OF THE DRAWINGS

FIG. 5 is a view illustrating a table expressing a relationship among a pattern density, a haze value, and a visibility of the object 10 viewed by the observer;

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A liquid crystal panel that can switch between a transparent state and an opaque state is used in the display device, and arranged between an object presented to an observer and the observer. In the display device, while the liquid crystal panel is in the opaque state, the liquid crystal panel is illuminated from a back surface with light emitted from liquid crystal panel illuminating light source arranged in a side surface of a light guide plate through the light guide plate arranged on the back surface of the liquid crystal panel to display an image or a pattern on the liquid crystal panel, and an object illuminating light source behind the liquid crystal panel is turned off, whereby the observer is made blind to the object. On the other hand, in the display device, the liquid crystal panel is put into the transparent state, the liquid crystal panel illuminating light source is turned off, and the object illuminating light source is lit, whereby the observer can visually recognize the object through the liquid crystal panel. Therefore, the display device can switch between display and non-display of the object at a response speed of the liquid crystal panel.

Hereinafter, for convenience of explanation, it is assumed that the side facing the observer is a front surface while an opposite side to the front surface is a back surface.

Figure 1:
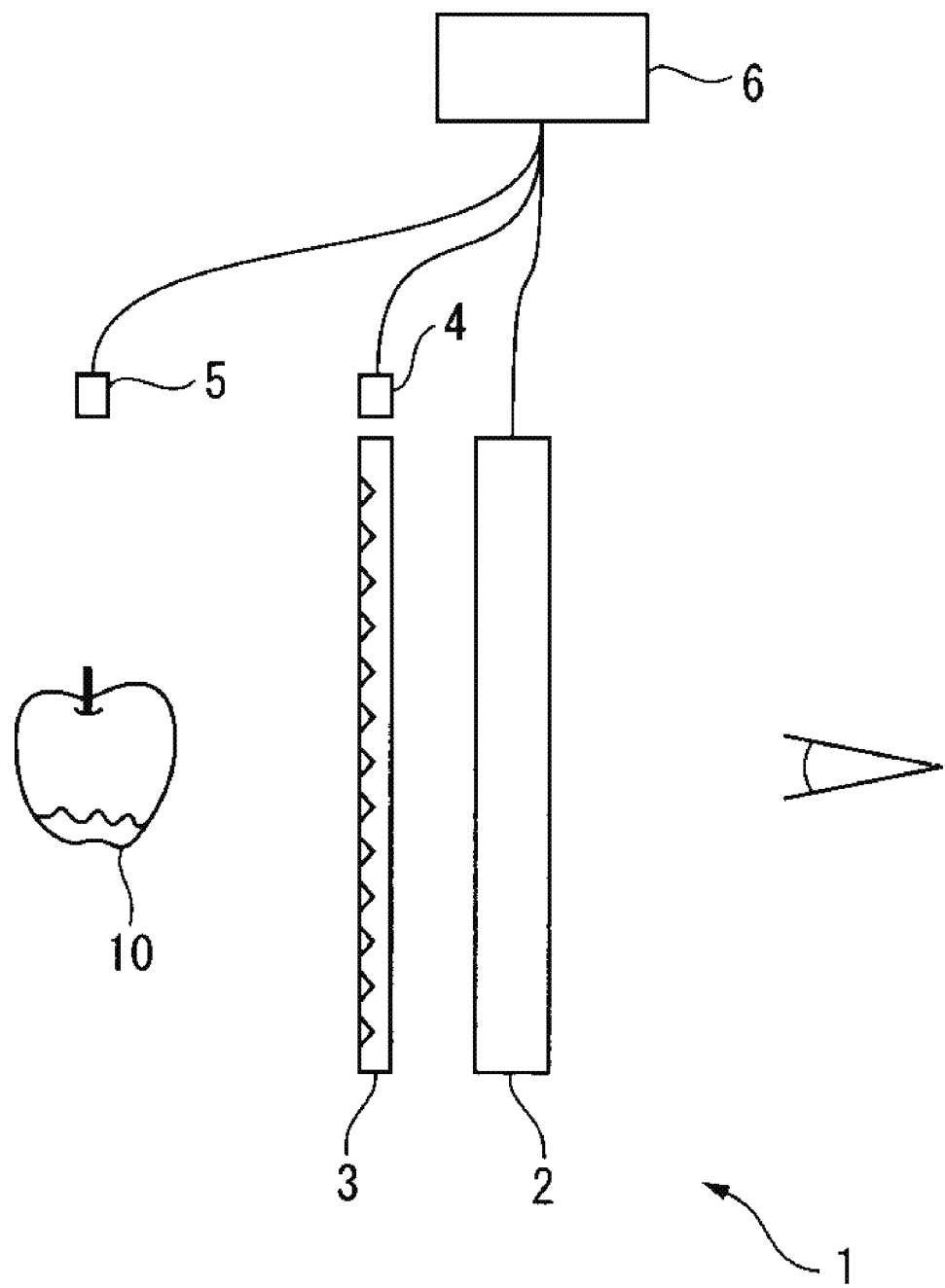
FIG. 1 is a schematic configuration diagram illustrating a display device according to one or more embodiments of the present invention.

FIG. 1 is a schematic configuration diagram illustrating the display device according to one embodiment of the present invention. A display device 1 includes a liquid crystal panel 2, a light guide plate 3, a first light source 4, a second light source 5, and a controller 6.

The liquid crystal panel 2 is a panel configured to switch between the transparent state and the opaque state according to a voltage applied from the controller 6. For example, the liquid crystal panel 2 includes a liquid crystal layer in which liquid crystal molecules are sealed, two transparent electrodes, two transparent substrates, and two polarizing plates. The transparent electrodes made of ITO are arranged so as to face each other with the liquid crystal layer interposed therebetween. The transparent substrates made of glass or transparent resin are arranged so as to face each other with the liquid crystal layer and the transparent electrode interposed therebetween. The polarizing plates are arranged so as to face each other with the liquid crystal layer, the transparent electrode, and the transparent substrate interposed therebetween. An oriented film may be formed between the liquid crystal layer and the transparent electrode in order to define orientations of the liquid crystal molecules. One of the transparent electrodes may be formed in a matrix state so as to be able to adjust a voltage applied in units of pixels.

For example, the two oriented films orient the liquid crystal molecules of the liquid crystal layer toward a predetermined direction. For example, in the case that the liquid crystal molecules included in the liquid crystal layer are arrayed into a twist nematic type, the two oriented films are arranged such that the orientations of the oriented films are orthogonal to each other. Each of the two polarizing plates is an element configured to transmit a polarization component having a polarization plane in a specific direction. For example, the two polarizing plates are arranged such that transmission axes of the polarizing plates are orthogonal to each other in order to cause the crystal panel 2 to operate in a normally white mode. Unless an electric field is applied between the two transparent electrodes between which the liquid crystal layer is interposed, a polarization direction of the light transmitted through the polarizing plate arranged on a back surface side rotates in the liquid crystal layer by 90°. Therefore, the light can be transmitted through the polarizing plate arranged on a front surface side. Therefore, the liquid crystal panel becomes transparent. On the other hand, when an electric field is applied between the two transparent electrodes between which the liquid crystal layer is interposed, the polarization plane of the light transmitted through the liquid crystal layer does not rotate because the liquid crystal molecules in the liquid crystal layer are oriented toward a direction parallel to the electric field. Therefore, the liquid crystal panel becomes opaque because the light transmitted through the polarizing plate arranged on the back surface side cannot be transmitted through the polarizing plate arranged on the front surface side.

The polarizing plates may be arranged such that transmission axes of the polarizing plates are parallel to each other in order to cause the crystal panel 2 to operate in a normally black mode. The liquid crystal panel becomes transparent when the electric field is applied between the two transparent electrodes between which the liquid crystal layer is interposed, and the liquid crystal panel becomes opaque unless the electric field is applied between the two transparent electrodes between which the liquid crystal layer is interposed.

The liquid crystal panel 2 is not limited to the above liquid crystal panel, but any liquid crystal panel may be used as long as the liquid crystal panel can switch between the transparent state and the opaque state in response to a control signal from the controller 6.

Figure 2B:
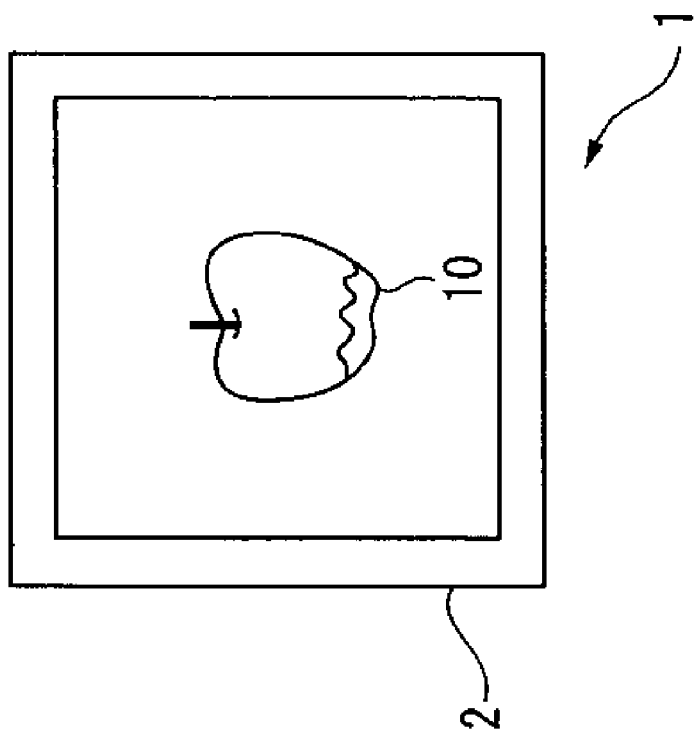
FIG. 2B is a schematic front view illustrating the display device when the liquid crystal panel is in a transparent state.
Figure 2A:
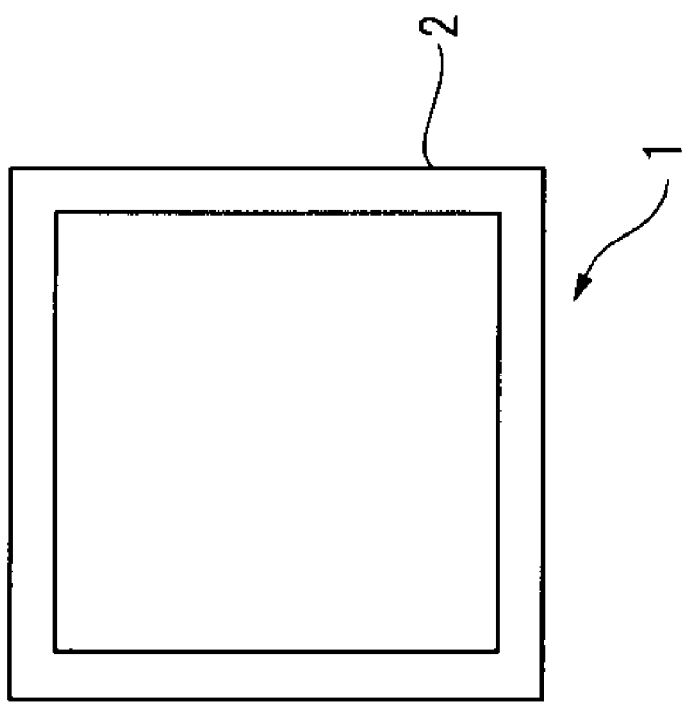
FIG. 2A is a schematic front view illustrating the display device when a liquid crystal panel is in an opaque state.

FIG. 2A is a schematic front view illustrating the display device when the liquid crystal panel is in the opaque state, and FIG. 2B is a schematic front view illustrating the display device when the liquid crystal panel is in the transparent state. As illustrated in FIG. 2A, when the liquid crystal panel 2 is in the opaque state, an object 10 behind thereof hides behind a display region of the liquid crystal panel 2, and the observer cannot visually recognize the object 10. On the other hand, as illustrated in FIG. 2B, when the liquid crystal panel 2 is in the transparent state, the observer can visually recognize the object 10 through the display region of the liquid crystal panel 2.

When the first light source 4 is lit, the light emitted from the first light source 4 is diffusely propagated through the light guide plate 3, and output toward the liquid crystal panel 2, thereby illuminating the liquid crystal panel 2 with the light. When the second light source 5 is lit, the light from the object 10 illuminated by the second light source 5 is transmitted through the light guide plate 3 from the back surface side to the side of the liquid crystal panel 2. Therefore, the light guide plate 3 is a sheet-like member having an area larger than an active region where the liquid crystal molecules of the liquid crystal panel 2 can be driven, and the light guide plate 3 is arranged so as to face the back surface of the liquid crystal panel 2. For example, the light guide plate 3 is formed by molding resins, such as polymethylmethacrylate (PMMA), polycarbonate, and cycloolefin polymer, which are transparent to visible light.

An incident surface 3a is formed in one of side surfaces of the light guide plate 3 so as to face the first light source 4, and the light emitted from the first light source 4 is incident on the light guide plate 3 from the incident surface 3a. The light propagated through the light guide plate 3 is totally reflected by a diffusing surface 3b located on the back surface side, output from an outgoing surface 3c facing the back surface of the liquid crystal panel 2, and incident on the liquid crystal panel 2.

When the second light source 5 is lit, the light emitted from the second light source 5 is reflected or diffused by the object 10, then incident on the light guide plate 3 from the diffusing surface 3b of the light guide plate 3, transmitted directly through the light guide plate 3, and output toward the liquid crystal panel 2 from the outgoing surface 3c.

Figure 3A:
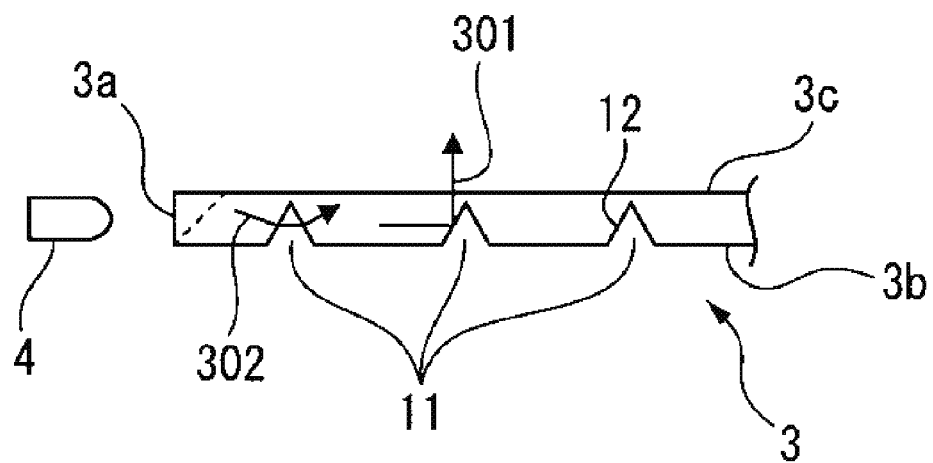
FIG. 3A is a sectional side view illustrating a light guide plate.

FIG. 3A is a sectional side view illustrating the light guide plate 3 along a propagation direction of the light perpendicularly incident on the incident surface of the light guide plate from the first light source 4. In the embodiment, the incident surface 3a is formed so as to be orthogonal to the diffusing surface 3b and the outgoing surface 3c. The incident surface 3a may be formed into a shape convex toward the first light source 4 so as to act as a collimate lens that enhances directionality of the light incident from the first light source 4.

A plurality of prisms 11 are formed in the diffusing surface 3b so as to reflect the light incident from the incident surface 3a, to uniformly output the light from the whole outgoing surface 3c, and to cause the light to be incident substantially perpendicularly on the liquid crystal panel 2.

The plurality of prisms 11 are arrayed with a predetermined pitch along the propagation direction of the incident light incident from the incident surface 3a. In the diffusing surface 3b, each prism 11 is formed as a substantially triangular groove that is extended in a direction substantially perpendicular to the propagation direction of the incident light incident from the incident surface 3a. Each prism 11 includes a reflecting surface 12 that forms a predetermined angle with respect to the diffusing surface 3b. The predetermined angle is fixed according to the propagation direction of the incident light and the direction of the light output from the light guide plate 3. In the embodiment, the propagation direction of the incident light is substantially parallel to the diffusing surface 3b, and the light guide plate 3 outputs the light in the direction substantially perpendicular to the outgoing surface 3c. Therefore, for example, each reflecting surface 12 is formed so as to form an angle of 37° to 45° with respect to the diffusing surface 3b. Particularly, each reflecting surface 12 is desirably provided such that an angle α (unit: °) formed between the reflecting surface 12 and the diffusing surface 3b satisfies the following condition.

$$\alpha < 90 - \tan^{-1}(\sqrt{n^2-1}) \quad (1)$$

where n is a refractive index of the light guide plate 3. Additionally, the light emitting element included in the first light source 4 is desirably selected such that a half-value angle β (unit: °) of the light emitted from the first light source 4 satisfies the following condition.

$$\beta < 109.74n - 155.06 \quad (2)$$

For example, in the case that the light guide plate 3 is made of PMMA (refractive index n=1.49), α<42.17° and β<8.5° are obtained. In the case that the light guide plate 3 is made of polycarbonate (refractive index n=1.59), α<38.97° and β<19.4° are obtained.

In this case, because the incident angle of the light incident on each reflecting surface 12 is larger than a critical angle, the incident light is totally reflected by each reflecting surface 12 as indicated by an arrow 301. Therefore, the light guide plate 3 restrains the incident light of the first light source 4 from outputting from the side of the diffusing surface 3b, which allows restraint of a light quantity that is not used in the illumination of the liquid crystal panel 2.

In the case that the liquid crystal panel 2 is in the opaque state when the observer obliquely views the display device 1, desirably a viewing angle is ensured to a certain extent such that an image displayed on the liquid crystal panel 2 is viewed. For example, in order to ensure the viewing angle of 15° or more, desirably the angle α formed between the reflecting surface 12 and the diffusing surface 3b and the half-value angle β of the first light source 4 satisfy the following conditions.

$$\alpha < 1.4924n + 40.274 \quad (3)$$

$$\beta < -0.0327n + 7.5127 \quad (4)$$

For example, in the case that the light guide plate 3 is made of PMMA (refractive index n=1.49), α<42.5° and β<7.46° are obtained. In the case that the light guide plate 3 is made of polycarbonate (refractive index n=1.59), α<42.7° and β<7.46° are obtained.

Desirably the pitch between adjacent prisms 11 is kept constant such that the intensity of the light output from the outgoing surface 3c is uniformed regardless of the position.

Figure 3B:
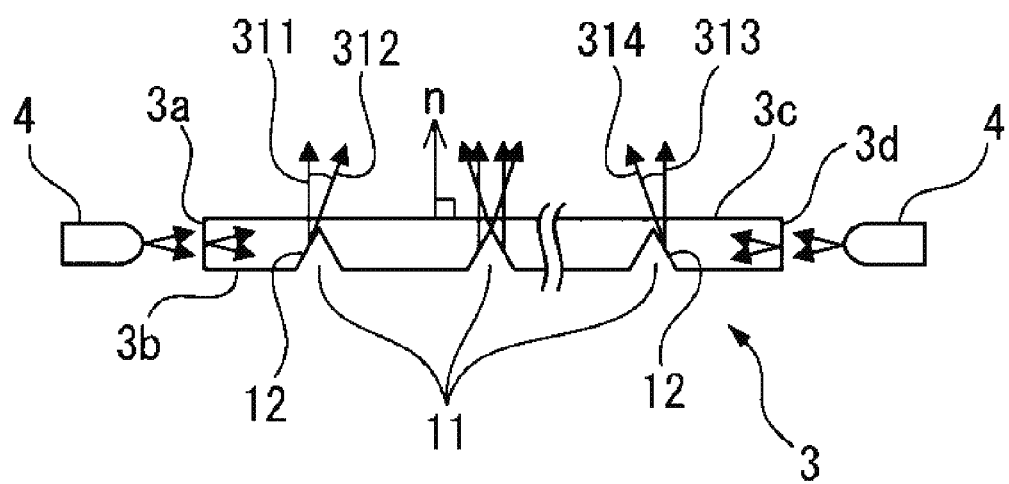
FIG. 3B is a sectional side view illustrating the light guide plate on which light are incident from two directions.

As illustrated in FIG. 3B, two incident surfaces 3a and 3d may be formed in two side surfaces facing each other in the light guide plate 3 so as to face each other with the plurality of prisms 11 interposed therebetween. The first light source 4 may include a light emitting element that emits the light incident on the light guide plate 3 from the incident surface 3a and a light emitting element that emits the light incident on the light guide plate 3 from the incident surface 3d. In this case, both the surfaces of each prism 11 constitute the reflecting surface 12 that is formed so as to satisfy the expression (1) or (3) with respect to the diffusing surface 3b, and the surfaces totally reflect the incident light toward the side of the outgoing surface 3c. For example, a light emitting element having the half-value angle satisfying the expression (2) or (4) is used as the light emitting element that is arranged so as to face the incident surface 3d.

In this modification, a range (a range surrounded by arrows 311 and 312) where the light, which is incident from the side of the incident surface 3a and output from the outgoing surface 3c, spreads and a range (a range surrounded by arrows 313 and 314) where the light, which is incident from the side of the incident surface 3d and output from the outgoing surface 3c, spreads are opposite to each other with respect to a normal n of the outgoing surface 3c. Therefore, the viewing angle becomes wider than the example in FIG. 3A.

In another modification, the side surface facing the incident surface 3a of the light guide plate 3 may be formed into a mirror surface such that the light propagating through the light guide plate 3 is reflected toward the inside of the light guide plate 3. In this case also, the effect similar to that of the above modification is obtained.

In still another modification, the incident surface 3a may be formed so as to form an angle of 45° with respect to the diffusing surface 3b as indicated by a dotted line in FIG. 3A. In this case also, for example, the light incident on the light guide plate 3 from the incident surface 3a is incident on the diffusing surface 3b and the outgoing surface 3c at the angle of about 45°, and totally reflected by the diffusing surface 3b and the outgoing surface 3c, thereby propagating through the light guide plate 3. In this case, for the light propagating through the light guide plate 3 to reach the prism 11, sometimes the angle incident on the reflecting surface 12 is less than the critical angle. However, even in this case, as indicated by an arrow 302, because the light is refracted toward the side of the diffusing surface 3b when output from the reflecting surface 12, the light is incident on the light guide plate 3 again from the surface farther away from the light source 4 of the prism 11. Therefore, a loss of the amount of light output onto the side of the back surface side from the diffusing surface 3b is restrained.

Figure 4A:
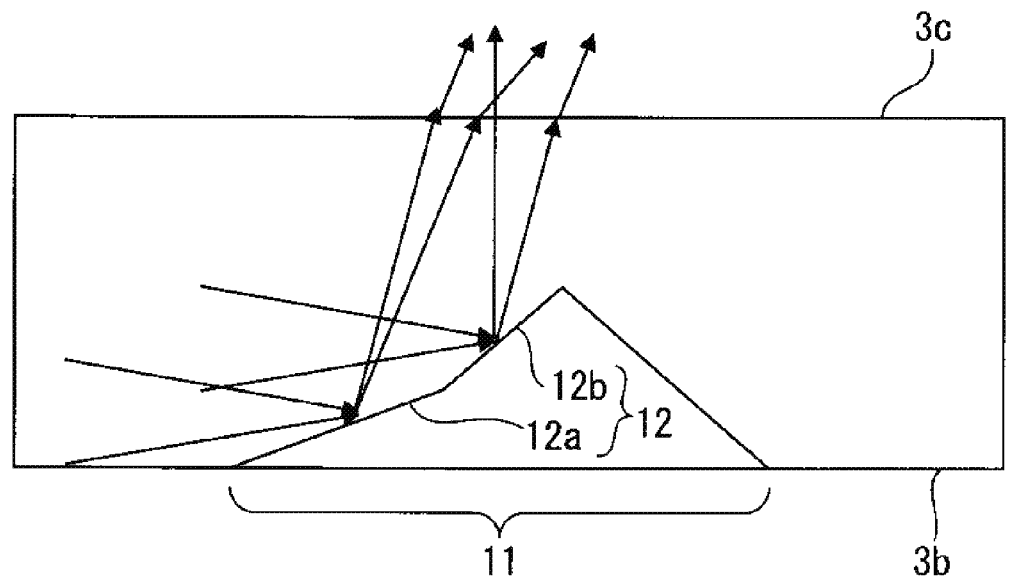
FIG. 4A is a partially enlarged sectional side view illustrating a shape of a reflecting surface of a prism in a light guide plate according to a modification.
Figure 4B:
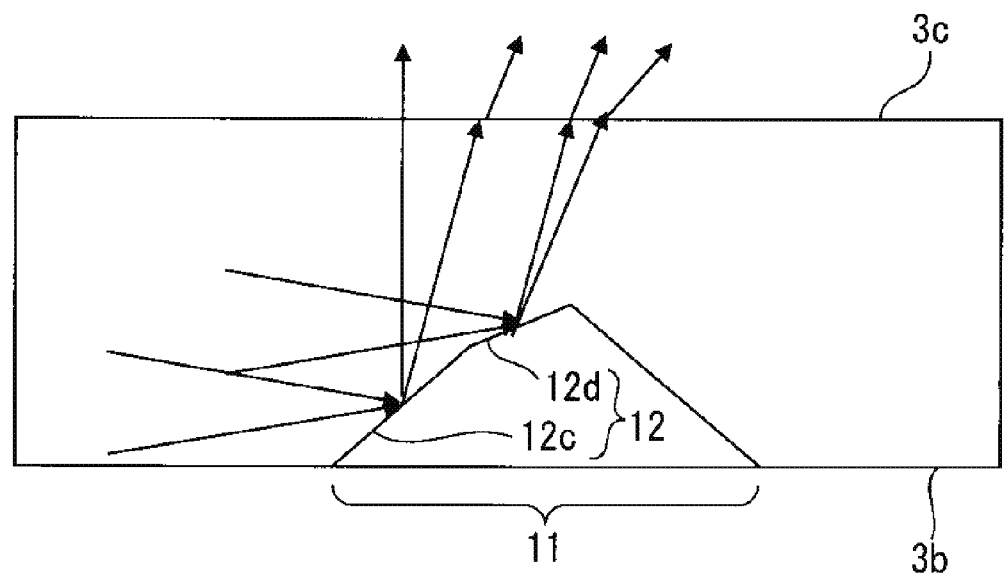
FIG. 4B is a partially enlarged sectional side view illustrating a shape of a reflecting surface of a prism in a light guide plate according to another modification.

In yet another modification, as illustrated in FIG. 4A, the reflecting surface 12 of the prism 11 may be formed by a plurality of flat surfaces 12a and 12b such that an inclination angle of the reflecting surface 12 with respect to the diffusing surface 3b increases toward the outgoing surface 3c. Alternatively, the reflecting surface 12 may be formed into a cylindrical surface such that the cylindrical surface is concave to the incident surface 3a, and such that the center of the cylindrical surface is parallel to the outgoing surface 3c. In this case, the directionality of the light output from the outgoing surface 3c is enhanced. Alternatively, as illustrated in FIG. 4B, the reflecting surface 12 of the prism 11 may be formed by a plurality of flat surfaces 12c and 12d such that the reflecting surface 12 is convex to the incident surface 3a, and such that an inclination angle of the reflecting surface 12 with respect to the diffusing surface 3b increases toward the outgoing surface 3c. Alternatively, the reflecting surface 12 may be formed into a cylindrical surface such that the cylindrical surface is convex to the incident surface 3a, and such that the center of the cylindrical surface is parallel to the outgoing surface 3c. In this case, because the light incident on the light guide plate 3 is reflected by the reflecting surface 12 to spread, the viewing angle becomes wider.

Desirably the pattern density, which is a ratio of an area of a region where the prism 11 is formed to an area of the diffusing surface 3b, is less than or equal to an upper limit of the pattern density at which the observer feels the visual recognition of the object 10 behind the light guide plate 3 through the transparent member or an empty space when the liquid crystal panel 2 becomes the transparent state. On the other hand, desirably the pattern density is greater than or equal to a lower limit of the pattern density at which the observer can visually recognize the image or pattern displayed on the liquid crystal panel 2 with the light emitted from the first light source 4 when the liquid crystal panel 2 becomes the opaque state.

Alternatively, desirably the haze value expressing a percentage of the diffused light to the whole transmitted light is less than or equal to the upper limit of the haze value at which the observer feels the visual recognition of the object 10 behind the light guide plate 3 through the transparent member or the empty space when the liquid crystal panel 2 becomes the transparent state.

FIG. 5 is a table illustrating a relationship among the pattern density, a haze value, and a visibility of the object 10 viewed by the observer in a visual test. In a table 500, a left-end column expresses the pattern density, a central column expresses the haze value, and a right-end column expresses a visual recognition result. In the visual test, one chip type white LED (LP-3020H196W) was used as the second light source 5. The haze value was measured with a haze meter HM-150L2 (product of MURAKAMI COLOR RESEARCH LABORATORY CO., Ltd.). In visually observing the object 10 illuminated by the second light source 5 through the light guide plate 3 and the liquid crystal panel 2 in the transparent state, the visual test is good (OK) when the observer feels that the member in front of the object 10 is the transparent member, and the visual test is bad (NG) when the observer feels that the opaque member exists in front of the object 10.

As illustrated in the table 500, the visual recognition result becomes NG when the pattern density is greater than 30% or when the haze value is greater than 28%. Therefore, for example, desirably each prism 11 is formed such that the pattern density is less than or equal to 30.0%. Alternatively, desirably each prism 11 is formed such that the haze value is less than or equal to 28%.

Figure 6A:
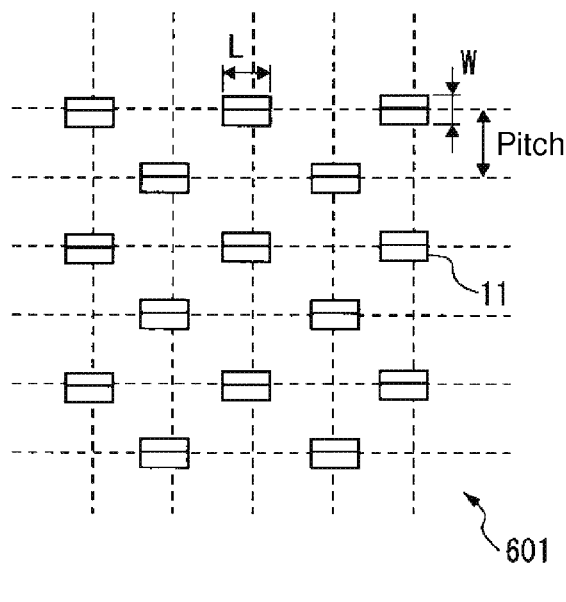
FIGS. 6A to 6C are views illustrating examples of an arrangement pattern of the prism when the pattern density is less than or equal to 30.0% and when the haze value is less than or equal to 28%.
Figure 6B:
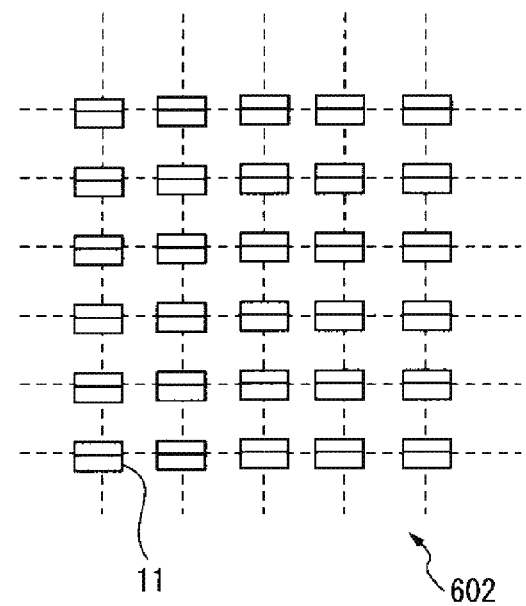
Figure 6C:
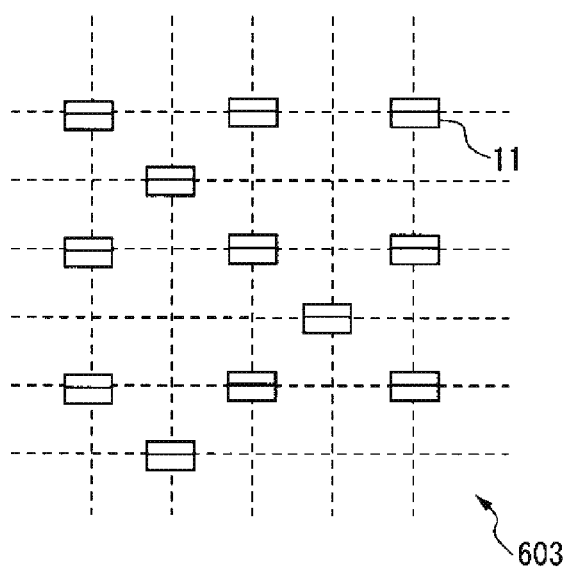

FIGS. 6A to 6C are views illustrating examples of an arrangement pattern of the prism when the pattern density is less than or equal to 30.0% and when the haze value is less than or equal to 28%. In the examples of FIGS. 6A to 6C, for each prism 11, a length W along the propagation direction of the incident light is 27.5 μm, and a length L in the direction orthogonal to the propagation direction of the incident light is 55 μm. For example, in the case of the pattern density of about 30.0% and the haze value of about 28%, the prisms 11 are arranged in a zigzag manner with a pitch of 50 μm like an arrangement pattern 601 in FIG. 6A.

Alternatively, the prisms 11 may be arranged into a lattice shape like an arrangement pattern 602 in FIG. 6B. In this case, for example, the prisms 11 are arranged with a pitch of 100 μm.

Alternatively, like an arrangement pattern 603 in FIG. 6C, the prisms 11 may be arranged such that the number of prisms 11 varies in each column of the direction orthogonal to the incident surface 3a.

For example, the first light source 4 includes a light emitting element such as a white light emitting diode and a fluorescent light, and is arranged such that an emission surface of the first light source 4 faces the incident surface 3a of the light guide plate 3. For example, the first light source 4 is arranged such that the direction of the strongest emission intensity of the first light source 4 is orthogonal to the incident surface 3b. For example, desirably a light emitting element having the directionality is used as the first light source 4 in order to enhance use efficiency of the light. Alternatively, a collimate lens may be arranged between the incident surface 3b and the first light source 4 in order to enhance the directionality of the light emitted from the first light source 4. The first light source 4 may include a plurality of light emitting elements. The first light source 4 is lit or turned off in response to the control signal from the controller 6.

For example, the second light source 5 includes a light emitting element such as a white light emitting diode and a fluorescent light, and is arranged so as to illuminate the object 10 arranged on the back surface side of the light guide plate 3. In order to illuminate the object 10 with the light source having a specific color, a light emitting element, such as a diode, which emits the light having the specific color may be used as the second light source 5. In the case that the object 10 is opaque, desirably the second light source 5 is arranged at the position closer to light guide plate 3 than the object 10 such that the light reflected or scattered by the object 10 is incident on the light guide plate 3. The second light source 5 may include a plurality of light emitting elements. For example, the second light source 5 may include a plurality of light emitting elements that are arranged so as to surround the object 10. The second light source 5 itself may be an object that is observed through the display region of the liquid crystal panel 2. Desirably the second light source 5 is arranged such that the light from the second light source 5 is not directly incident on the incident surface 3a of the light guide plate 3. Similarly to the first light source 4, the second light source 5 is lit or turned off in response to the control signal from the controller 6.

For example, the controller 6 includes a processor, a memory circuit, and a driving circuit of the liquid crystal panel 2. In response to a control signal of a superior control device (not illustrated), the controller 6 controls the liquid crystal panel 2, the first light source 4, and the second light source 5. In order to make the observer located on the front surface side of the liquid crystal panel 2 blind to the object 10, the controller 6 puts the liquid crystal panel 2 into the opaque state. The controller 6 lights the first light source 4 while turning off the second light source 5. On the other hand, in order to make the observer located on the front surface side of the liquid crystal panel 2 see the object 10, the controller 6 puts the liquid crystal panel 2 into the transparent state. The controller 6 turns off the first light source 4 while lighting the second light source 5.

As described above, in the display device, the controller switches between the transparent state and opaque state of the liquid crystal panel, which enables or disables the object behind the liquid crystal panel to be visually recognized by the observer. Therefore, the display device can switch between display and non-display of the object at a response speed of the liquid crystal panel. The response speed of the liquid crystal panel is less than 100 milliseconds or 1 second, so that the display device can enhance the response speed of the switching between the display and the non-display. In the display device, both the liquid crystal panel and the light guide plate does not have wavelength selectivity too high, so that the object is not colored even if the observer views the object through the liquid crystal panel and the light guide plate.

In a modification, the pattern formed in the diffusing surface 3b of the light guide plate 3 may be a trapezoidal pattern that projects from the diffusing surface 3b toward the side of the object 10.

Figure 7:
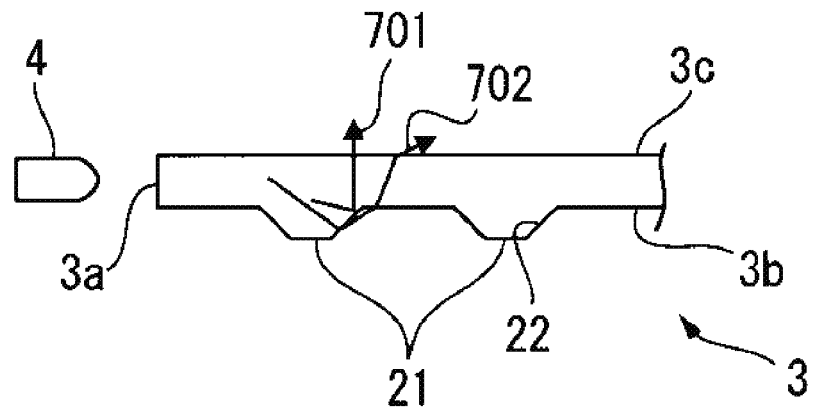
FIG. 7 is a sectional side view illustrating a light guide plate according to a modification.

FIG. 7 is a sectional side view illustrating the light guide plate 3 of the modification. In the embodiment, the incident surface 3a is formed so as to be orthogonal to the diffusing surface 3b and the outgoing surface 3c. A plurality of trapezoidal prisms 21 are formed in the diffusing surface 3b so as to reflect the light incident from the incident surface 3a, to uniformly output the light from the whole outgoing surface 3c, and to cause the light to be incident substantially perpendicularly on the liquid crystal panel 2.

The plurality of trapezoidal prisms 21 are arrayed with a predetermined pitch along the propagation direction of the incident light incident from the incident surface 3a. In the diffusing surface 3b, each prism 21 is formed as a trapezoidal projection along a direction substantially perpendicular to the propagation direction of the incident light from the incident surface 3a. Desirably, in the case that the light propagating through the light guide plate 3 has a small angle with respect to the diffusing surface 3b, a slope 22 of each prism 21 on the side farther away from the light source 4 is formed so as to totally reflect the light onto the side of the outgoing surface 3c as indicated by an arrow 701. Desirably, even in the case that the light propagating through the light guide plate 3 can hardly be totally reflected because the light has a relatively large angle with respect to the diffusing surface 3b, the slope 22 is formed such that the light output to the outside of the light guide plate 3 from the slope 22 is refracted by the slope 22 toward the side of the diffusing surface 3b as indicated by an arrow 702. For example, desirably the slope 22 is formed so as to form the angle of 45° with respect to the diffusing surface 3b. There is no particular limitation to the slope of each prism 21 on the side closer to the light source 4, but the slope may have an angle at which the light guide plate 3 is easily mold.

In this modification, desirably each prism 21 is formed such that the pattern density is less than or equal to 30%, or such that the haze value is less than or equal to 28%. For example, desirably each prism 21 is formed such that the prism 21 has a width of 30 μm along the propagation direction of the incident light, and such that an interval between the two adjacent prisms 21 is 100 μm.

In another modification, the diffusing surface 3b of the light guide plate 3 may be formed on a flat surface so as to totally reflect the light propagating through the light guide plate 3, and a plurality of trapezoidal prisms may be formed on the side of the outgoing surface 3c.

Figure 8:
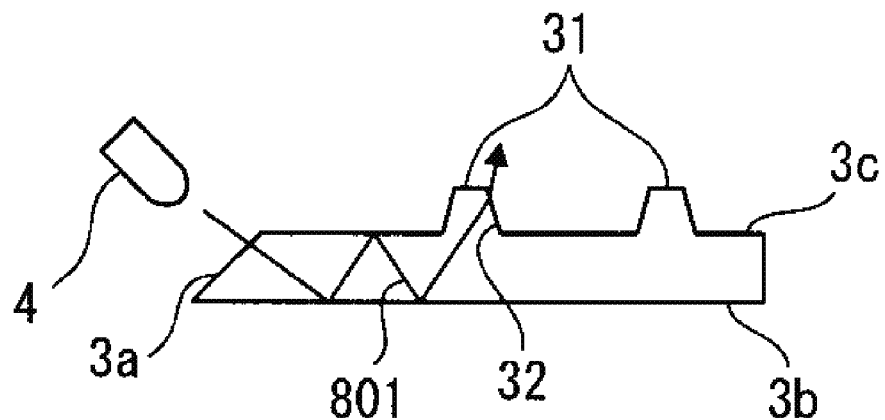
FIG. 8 is a sectional side view illustrating a light guide plate according to another modification.

FIG. 8 is a sectional side view illustrating the light guide plate 3 of the modification. In the embodiment, for example, the incident surface 3a is formed at the angle of 45° with respect to the diffusing surface 3b such that the light from the first light source 4 propagates through the light guide plate 3 at the angle at which almost the light is totally reflected by the diffusing surface 3b. The first light source 4 is also arranged such that the direction of the strongest emission intensity of the first light source 4 is orthogonal to the incident surface 3a. In this case, for example, the light incident on the light guide plate 3 from the incident surface 3a is incident on the diffusing surface 3b and the outgoing surface 3c at the angle of about 45°, and totally reflected by the diffusing surface 3b and the outgoing surface 3c, thereby propagating through the light guide plate 3. A plurality of trapezoidal prisms 31 are formed in the outgoing surface 3c such that the incident light totally reflected by the diffusing surface 3b is output onto the side of the liquid crystal panel 2.

The plurality of trapezoidal prisms 31 are arrayed with a predetermined pitch along the propagation direction of the incident light incident from the incident surface 3a. In the outgoing surface 3c, each prism 31 is formed as a trapezoidal projection along a direction substantially perpendicular to the propagation direction of the incident light from the incident surface 3a. Desirably, a slope 32 of each prism 31 on the side farther away from the light source 4 is formed such that the light propagating through the light guide plate 3 is refracted by the slope 32 and oriented toward the direction substantially orthogonal to the outgoing surface 3c as indicated by an arrow 801. For example, desirably the slope 32 is formed so as to form an angle of 70° to 80° with respect to the outgoing surface 3c. There is no particular limitation to the slope of each prism 31 on the side closer to the light source 4, but the slope may have an angle at which the light guide plate 3 is easily mold.

Even in this modification, desirably each prism 31 is formed such that the pattern density is less than or equal to 30%, or such that the haze value is less than or equal to 28%. For example, desirably each prism 31 is formed such that the prism 31 has a width of 30 μm along the propagation direction of the incident light, and such that an interval between the two adjacent prisms 31 is 100 μm.

Figure 9:
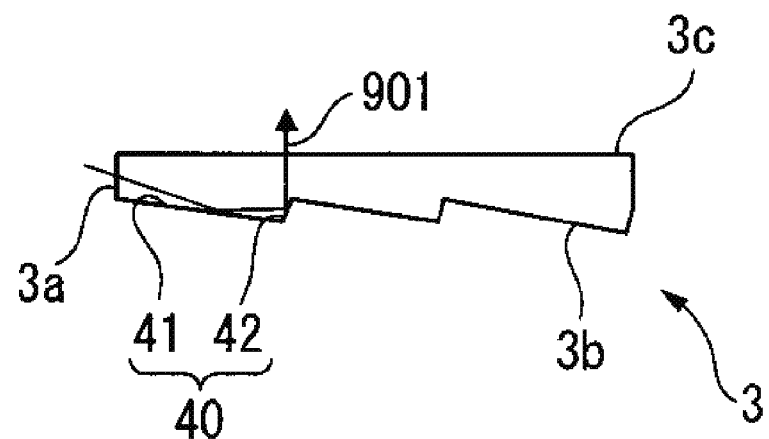
FIG. 9 is a sectional side view illustrating a light guide plate according to still another modification.

In still another modification, the diffusing surface 3b of the light guide plate 3 may be formed into a sawtooth shape. FIG. 9 is a sectional side view illustrating the light guide plate 3 of the modification. In this modification, the diffusing surface 3b includes triangular patterns 40 that are periodically arranged with a predetermined pitch along the propagation direction of the incident light incident from the incident surface 3a. Each pattern 40 includes a relatively wide first reflecting surface 41 and a second reflecting surface 42 narrower than the first reflecting surface 41. The first reflecting surface 41 is formed such that a thickness of the light guide plate 3 increases with distance from the first light source 4. The second reflecting surface 42 is formed such that the thickness of the light guide plate 3 decreases with distance from the first light source 4. For example, the first reflecting surface 41 is formed at an angle of 10° to 20° with respect to the outgoing surface 3c so as to totally reflect the light propagating through the light guide plate 3. On the other hand, the second reflecting surface 42 is formed at an angle (for example, 70° to 80°) larger than that of the first reflecting surface 41 with respect to the outgoing surface 3c such that the light, which is reflected by the first reflecting surface 41 and incident on the second reflecting surface 42, is totally reflected and oriented toward the direction substantially perpendicular to the outgoing surface 3c as indicated by an arrow 901.

In still another modification, the light guide plate 3 may be a front light type light guide plate.

Figure 10:
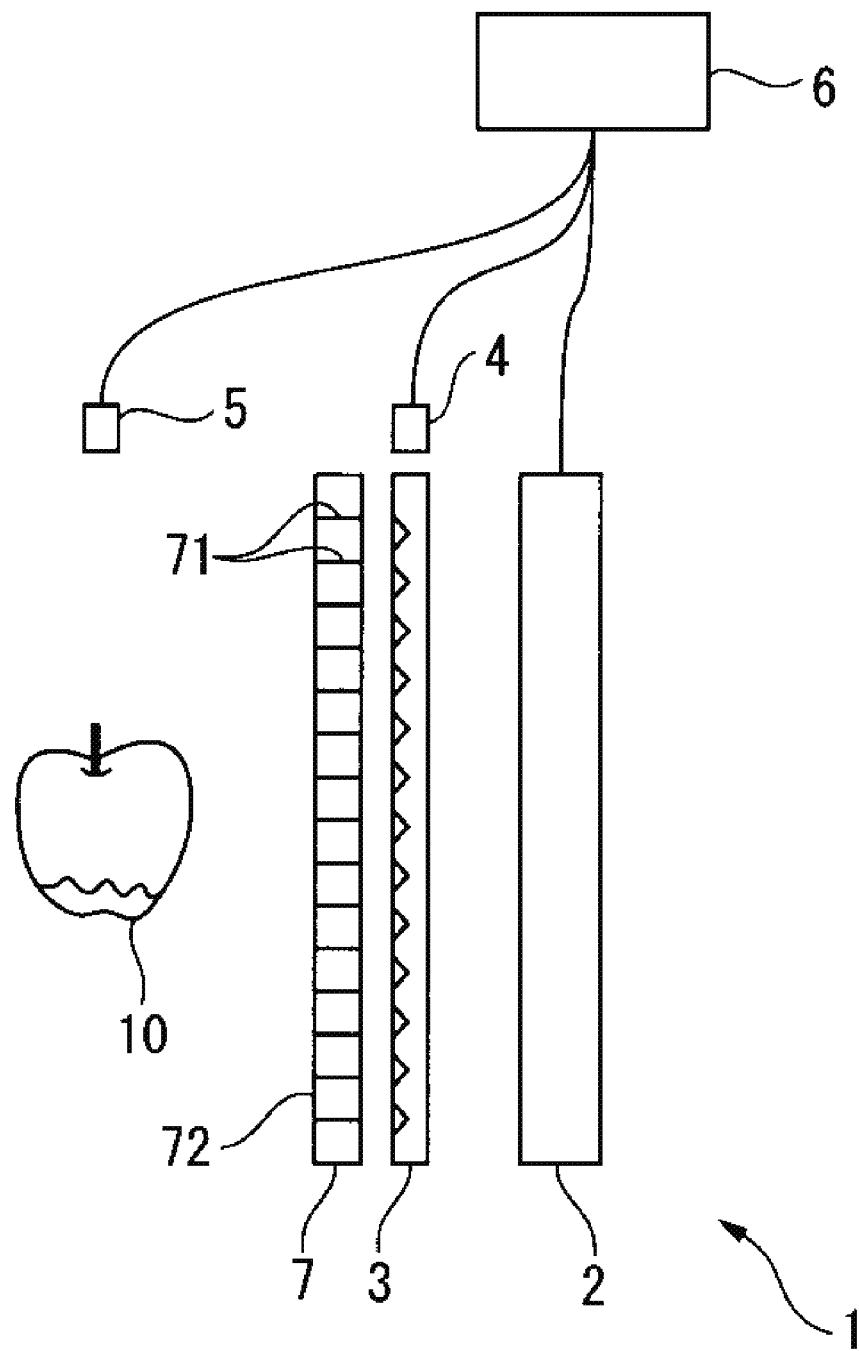
FIG. 10 is a schematic configuration diagram illustrating a display device according to a modification including a louver film.

In still another modification, as illustrated in FIG. 10, a louver film 7 that blocks the obliquely incident light may be arranged between the light guide plate 3 and the object 10. In this case, the second light source 5 is arranged on the side of the object 10 with respect to the louver film 7 so as not to be affected by the louver film 7. The louver film 7 is an example of the direction-selectivity light shielding member.

In the louver film 7, a plurality of plate-like opaque members 71 are arranged with a predetermined pitch along the propagation direction of the light emitted from the first light source 4 in a plate-like member made of a transparent material such as transparent resin. For example, the plurality of opaque members 71 are orthogonal to the surface facing the light guide plate 3, and extended along the direction intersecting the propagation direction of the light emitted from the first light source 4. Particularly, the plurality of opaque members 71 are desirably extended along a direction substantially parallel to the direction in which the prism 11 is extended. For example, the predetermined pitch may be set less than or equal to the width from the end on the side facing the light guide plate 3 of the opaque member 71 to the end on the side facing the object 10. Therefore, even if the light from the first light source 4 is output from the back surface side of the light guide plate 3, the light is blocked by the opaque member 71, and the object 10 is prevented from being illuminated with the light. On the other hand, the opaque member 71 does not block the light perpendicularly incident on a surface 72 of the louver film 7 facing the object 10. The light is emitted from the second light source 5, reflected or scattered by the object 10, and perpendicularly incident on a surface 72 of the louver film 7. Then, the light can be transmitted through the light guide plate 3 and the liquid crystal panel 2 to reach the observer. Therefore, the liquid crystal panel 2 is in the transparent state even if the louver film 7 exists, and the observer can visually recognize the object 10 while the second light source 5 is lit.

In this modification, desirably the light guide plate 3 is formed such that, in the light leaking from the first light source 4 to the back surface side of the light guide plate 3, the amount of light in which the angle formed with the normal of the diffusing surface 3b of the light guide plate 3 is greater than or equal to the viewing angle of the louver film 7 becomes at least double the amount of light in which the angle formed with the normal of the diffusing surface 3b of the light guide plate 3 is less than the viewing angle of the louver film 7. Alternatively, desirably the light guide plate 3 is formed such that, in the light leaking from the first light source 4 to the back surface side of the light guide plate 3, the amount of light in which the angle formed with the normal of the diffusing surface 3b of the light guide plate 3 is greater than or equal to 45° becomes at least double the amount of light in which the angle formed with the normal of the diffusing surface 3b of the light guide plate 3 is less than 45°.

In this modification, because the object behind the light guide plate is constrained from being illuminated with the light output onto the back surface side from the light guide plate 3, the observer can further hardly visually recognize the object behind the light guide plate while the first light source is lit.

In still another modification, a polarizer may be arranged between the light guide plate 3 and the object 10 so as to transmit only a polarization component having a polarization plane of a predetermined direction. In this case, the second light source 4 is arranged closer to the side of the object 10 with respect to the polarizer. In this case, desirably the polarizer is arranged such that a transmission axis of the polarizer is oriented toward the same direction as a transmission axis of the polarizing plate on the back surface side included in the liquid crystal panel 2.

In this modification, the light from the first light source 4 attenuates by being transmitted through the polarizer. When the light is reflected or scattered by the object 10 to change the polarization direction of the light, the light attenuates again by being transmitted through the polarizer before being incident on the light guide plate 3 again. On the other hand, the light that is emitted from the second light source 5 and reflected or scattered by the object 10 attenuates once by being transmitted through the polarizer. Accordingly, in this modification, even if the light from the first light source 4 is partially output onto the back surface side of the light guide plate 3, the light from the first light source 4 is attenuated more than the light from the second light source 5 by the polarizer, so that the observer can further hardly visually recognize the object behind the light guide plate while the first light source is lit.

In still another modification, in order to prevent the object 10 from being illuminated with the light from the first light source 4 or environmental light, a light shielding member made of an opaque material may be provided so as to surround the object 10. In this case, for example, the light shielding member can be formed into a hollow box shape in which a surface facing the light guide plate 3 constitutes an opened end. For example, desirably the object 10 is arranged so as to be located farther away from the light guide plate 3 than the opened end of the light shielding member. In this case, according to one or more embodiments of the present invention, the second light source 5 is also arranged in the light shielding member so as to be able to illuminate the object 10.

In still another modification, desirably the object 10 and the light guide plate 3 are arranged so as to separate from each other by a predetermined distance such that the light emitted from the first light source 4 is not incident on the light guide plate 3, or such that the light, which initially reaches the diffusing surface 3b of the light guide plate 3 and is output onto the back surface side from the diffusing surface 3b, is not incident on the light guide plate 3 by the reflection of the light from the object 10. In this case, for example, the distance between the object 10 and the light guide plate 3 can be set greater than or equal to $L \cos(\pi/4)$. Where L is a length of the light guide plate 3 from the incident surface 3a to the side surface on the opposite side. Therefore, even if the surface on the side facing the light guide plate 3 of the object 10 constitutes the flat surface while being parallel to the light guide plate 3, the light that is emitted from the first light source 4 and mirror-reflected by the object 10 is prevented from being incident on the light guide plate 3.

The display device of the embodiment and the modifications may be mounted on game machines such as a pachinko game machine and a reel type game machine.

Figure 11:
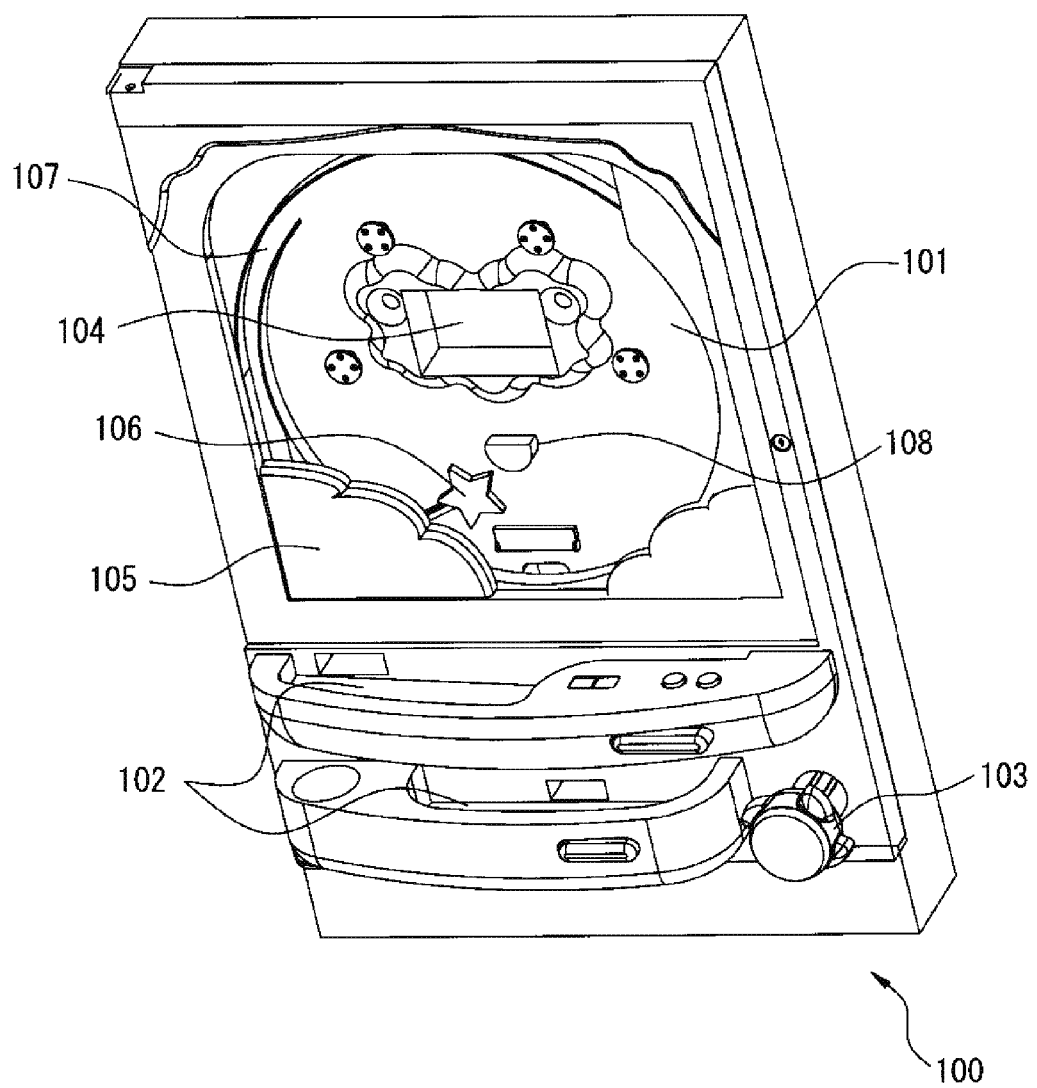
FIG. 11 is a schematic perspective view illustrating a pachinko game machine including the display device of the embodiment and the modifications when the pachinko game machine is viewed from a player side.

FIG. 11 is a schematic perspective view illustrating a pachinko game machine including the display device of the embodiment and the modifications when the pachinko game machine is viewed from a player side. As illustrated in FIG. 11, the pachinko game machine 100 includes a game board 101 that is of a game machine body provided in a most region from the top to a central portion, a ball receiving unit 102 provided below the game board 101, an operation unit 103 provided with a handgrip, and a display device 104 provided in the substantial center of the game board 101.

For the purpose of the game performance, the pachinko game machine 100 includes a fixed accessory unit 105 provided in a lower portion of the game board 101 in the front surface of the game board 101 and a movable accessory unit 106 arranged between the game board 101 and the fixed accessory unit 105. A rail 107 is arranged in a lateral surface of the game board 101. Many obstacle nails (not illustrated) and at least one winning device 108 are provided on the game board 101.

In the operation unit 103, a game ball is launched with a predetermined force from a launching device (not illustrated) according to a turning amount of the handgrip operated by the player. The launched game ball moves upward along the rail 107, and drops among the many obstacle nails. When a sensor (not illustrated) senses that the game ball enters one of the winning devices 108, a main control circuit (not illustrated) provided in the back surface of the game board 101 delivers a predetermined number of game balls to the ball receiving unit 102 through a game ball delivering device (not illustrated) according to the winning device 108 that the game ball enters. The main control circuit drives the display device 104 through a performance CPU (not illustrated) provided in the back surface of the game board 101.

The display device 104 is an example of the display device of the embodiment and the modifications, and attached to the game board 101 such that the front surface side of the liquid crystal panel is oriented toward the player. In response to the control signal from the performance CPU, according to the game state, the controller of the display device 104 puts the liquid crystal panel into the transparent state such that the player can visually recognize the object (not illustrated) arranged behind the display device 104, or puts the liquid crystal panel in the opaque state such that various images and graphics are displayed on the liquid crystal panel.

Thus, those skilled in the art can make various changes to the above embodiments without departing from the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A display device comprising:
    a liquid crystal panel that switches between a transparent state and an opaque state;
    a first light source;
    a light guide plate arranged on a back surface of the liquid crystal panel and made of a transparent material, the light guide plate comprising an incident surface facing the first light source and an outgoing surface facing the back surface of the liquid crystal panel, propagating light emitted from the first light source and incident through the incident surface, and outputting the light toward the liquid crystal panel from the outgoing surface;
    a second light source configured to illuminate an object arranged on an opposite side to the liquid crystal panel with the light guide plate interposed therebetween; and
    a controller configured to put the liquid crystal panel into the opaque state when the first light source is lit, to put the liquid crystal panel into the transparent state when the second light source is turned off while the second light source is lit, and to turn off the first light source.

2. The display device according to claim 1,
    wherein a plurality of patterns are formed in at least one of the outgoing surface of the light guide plate and a surface on opposite side to the outgoing surface, and
    wherein the plurality of patterns is formed into a shape that reflects or refracts the light propagating through the light guide plate such that the light output from the outgoing surface, and an area ratio of a region where the plurality of patterns are formed to the surface in which the plurality of patterns are formed is less than or equal to 30%.

3. The display device according to claim 2,
wherein the plurality of patterns are arrayed at predetermined intervals along a propagation direction of the light from the first light source in the surface on the opposite side to the outgoing surface, and
wherein each of the plurality of patterns comprises a reflecting surface that is inclined with respect to the surface on the opposite side to the outgoing surface by an angle at which the light, which is emitted from the first light source and incident on the light guide plate from the incident surface, is totally reflected toward the outgoing surface.

4. The display device according to claim 3,
wherein the light guide plate comprises a second incident surface that is formed so as to face the incident surface with the plurality of patterns interposed therebetween,
wherein the first light source comprises a first light emitting element that is arranged so as to face the incident surface and a second light emitting element that is arranged so as to face the second incident surface, and
wherein each of the plurality of patterns further comprises a second reflecting surface that is inclined with respect to the surface on the opposite side to the outgoing surface by an angle at which the light, which is emitted from the second light emitting element and incident on the light guide plate from the second incident surface, is totally reflected toward the outgoing surface.

5. The display device according to claim 1, wherein a haze value of the light guide plate to the light, which is incident on the light guide plate from the surface on the opposite side to the outgoing surface and transmitted onto the outgoing surface side, is less than or equal to 28%.

6. The display device according to claim 1, further comprising:
a direction-selective light shielding member formed into a sheet shape between the light guide plate and the object,
wherein the direction-selective light shielding member comprises a first surface facing the light guide plate and a second surface facing the object,
wherein the direction-selective light shielding member comprises, inside thereof, a plurality of opaque members arranged at predetermined intervals along the propagation direction of the light from the first light source, and
wherein the plurality of opaque members being extended in a direction intersecting the propagation direction.

7. The display device according to claim 2, wherein a haze value of the light guide plate to the light, which is incident on the light guide plate from the surface on the opposite side to the outgoing surface and transmitted onto the outgoing surface side, is less than or equal to 28%.

8. The display device according to claim 3, wherein a haze value of the light guide plate to the light, which is incident on the light guide plate from the surface on the opposite side to the outgoing surface and transmitted onto the outgoing surface side, is less than or equal to 28%.

9. The display device according to claim 4, wherein a haze value of the light guide plate to the light, which is incident on the light guide plate from the surface on the opposite side to the outgoing surface and transmitted onto the outgoing surface side, is less than or equal to 28%.

10. The display device according to claim 2, further comprising:
a direction-selective light shielding member formed into a sheet shape between the light guide plate and the object,
wherein the direction-selective light shielding member comprises a first surface facing the light guide plate and a second surface facing the object,
wherein the direction-selective light shielding member comprises, inside thereof, a plurality of opaque members arranged at predetermined intervals along the propagation direction of the light from the first light source, and
wherein the plurality of opaque members being extended in a direction intersecting the propagation direction.

11. The display device according to claim 3, further comprising:
a direction-selective light shielding member formed into a sheet shape between the light guide plate and the object,
wherein the direction-selective light shielding member comprises a first surface facing the light guide plate and a second surface facing the object,
wherein the direction-selective light shielding member comprises, inside thereof, a plurality of opaque members arranged at predetermined intervals along the propagation direction of the light from the first light source, and
wherein the plurality of opaque members being extended in a direction intersecting the propagation direction.

12. The display device according to claim 4, further comprising:
a direction-selective light shielding member formed into a sheet shape between the light guide plate and the object,
wherein the direction-selective light shielding member comprises a first surface facing the light guide plate and a second surface facing the object,
wherein the direction-selective light shielding member comprises, inside thereof, a plurality of opaque members arranged at predetermined intervals along the propagation direction of the light from the first light source, and
wherein the plurality of opaque members being extended in a direction intersecting the propagation direction.

13. The display device according to claim 5, further comprising:
a direction-selective light shielding member formed into a sheet shape between the light guide plate and the object,
wherein the direction-selective light shielding member comprises a first surface facing the light guide plate and a second surface facing the object,
wherein the direction-selective light shielding member comprises, inside thereof, a plurality of opaque members arranged at predetermined intervals along the propagation direction of the light from the first light source, and
wherein the plurality of opaque members being extended in a direction intersecting the propagation direction.

* * * * *